United States Patent
Düll et al.

(10) Patent No.: US 10,338,542 B2
(45) Date of Patent: Jul. 2, 2019

(54) METHOD FOR COMPUTER-AIDED INSTALLATION CONTROL OPTIMIZATION USING A SIMULATION MODULE

(71) Applicant: SIEMENS AKTIENGESELLSCHAFT, München (DE)

(72) Inventors: Siegmund Düll, München (DE); Alexander Hentschel, München (DE); Jatinder P. Singh, Charlotte, NC (US); Volkmar Sterzing, Neubiberg (DE); Steffen Udluft, Eichenau (DE)

(73) Assignee: Siemens Aktiengesellschaft (DE)

( * ) Notice: Subject to any disclaimer, the term of this patent is extended or adjusted under 35 U.S.C. 154(b) by 106 days.

(21) Appl. No.: 15/321,307

(22) PCT Filed: May 5, 2015

(86) PCT No.: PCT/EP2015/059844
§ 371 (c)(1),
(2) Date: Dec. 22, 2016

(87) PCT Pub. No.: WO2016/000851
PCT Pub. Date: Jan. 7, 2016

(65) Prior Publication Data
US 2017/0160706 A1    Jun. 8, 2017

(30) Foreign Application Priority Data
Jul. 1, 2014 (DE) .................. 10 2014 212 747

(51) Int. Cl.
*G06N 3/04* (2006.01)
*G05B 13/02* (2006.01)
*G05B 13/04* (2006.01)

(52) U.S. Cl.
CPC ......... *G05B 13/042* (2013.01); *G05B 13/027* (2013.01); *G05B 13/048* (2013.01);
(Continued)

(58) Field of Classification Search
CPC ... G05B 13/042; G05B 13/027; G06N 3/0445
(Continued)

(56) References Cited

U.S. PATENT DOCUMENTS

| 2010/0070098 A1 | 3/2010 | Sterzing et al. |
| 2013/0013543 A1 | 1/2013 | Dull et al. |

FOREIGN PATENT DOCUMENTS

| CN | 101573667 A | 11/2009 |
| CN | 101964019 A | 2/2011 |

(Continued)

OTHER PUBLICATIONS

International Search Report for PCT/EP2015/059844; International Filing Date: May 5, 2015; 2 Pgs.
(Continued)

*Primary Examiner* — Ryan A Jarrett
(74) *Attorney, Agent, or Firm* — Schmeiser, Olsen & Watts LLP.

(57) ABSTRACT

An interactive assistance system and method for computer-aided control optimization for a technical system is provided. For example, a gas or wind turbine, in particular for optimizing the action sequence or the control variables of the plant (e.g. gas supply, compression), wherein an input terminal is provided for reading at least one status parameter providing a first system status of the technical system, and at least one setting parameter for adapting a reward function. A simulation module having a pre-trained neuronal network, simulating the plant, serves to simulate an action sequence on the technical system, starting from the first system status and to the prediction of the resulting statuses of the technical system.

13 Claims, 1 Drawing Sheet

(52) U.S. Cl.
 CPC . *G06N 3/0445* (2013.01); *G05B 2219/23448* (2013.01); *G05B 2219/25255* (2013.01); *G05B 2219/32301* (2013.01); *Y02P 90/14* (2015.11); *Y02P 90/26* (2015.11)

(58) Field of Classification Search
 USPC .......................................................... 700/48
 See application file for complete search history.

(56) References Cited

FOREIGN PATENT DOCUMENTS

| CN | 102255320 A | 11/2011 | | |
|---|---|---|---|---|
| CN | 102792234 A | 11/2012 | | |
| DE | 102007017259 A1 | 10/2008 | | |
| DE | 102012216574 A1 | 3/2014 | | |
| EP | 0370327 A2 | 5/1990 | | |
| EP | 0370372 A2 | 5/1990 | | |
| EP | 1214631 A1 | 6/2002 | | |
| EP | 1217473 A1 | 6/2002 | | |
| EP | 1316866 A1 * | 6/2003 | ....... | G05B 19/41885 |
| EP | 1316866 A1 | 6/2003 | | |
| WO | WO-0122178 A1 * | 3/2001 | ............. | G05B 17/02 |

OTHER PUBLICATIONS

Notice of Allowance for Korean No. 10-2017-7002767 dated Oct. 30, 2018.
Non-English Chinese Office Action dated Dec. 21, 2018 for Application No. 201580035911.0.

* cited by examiner

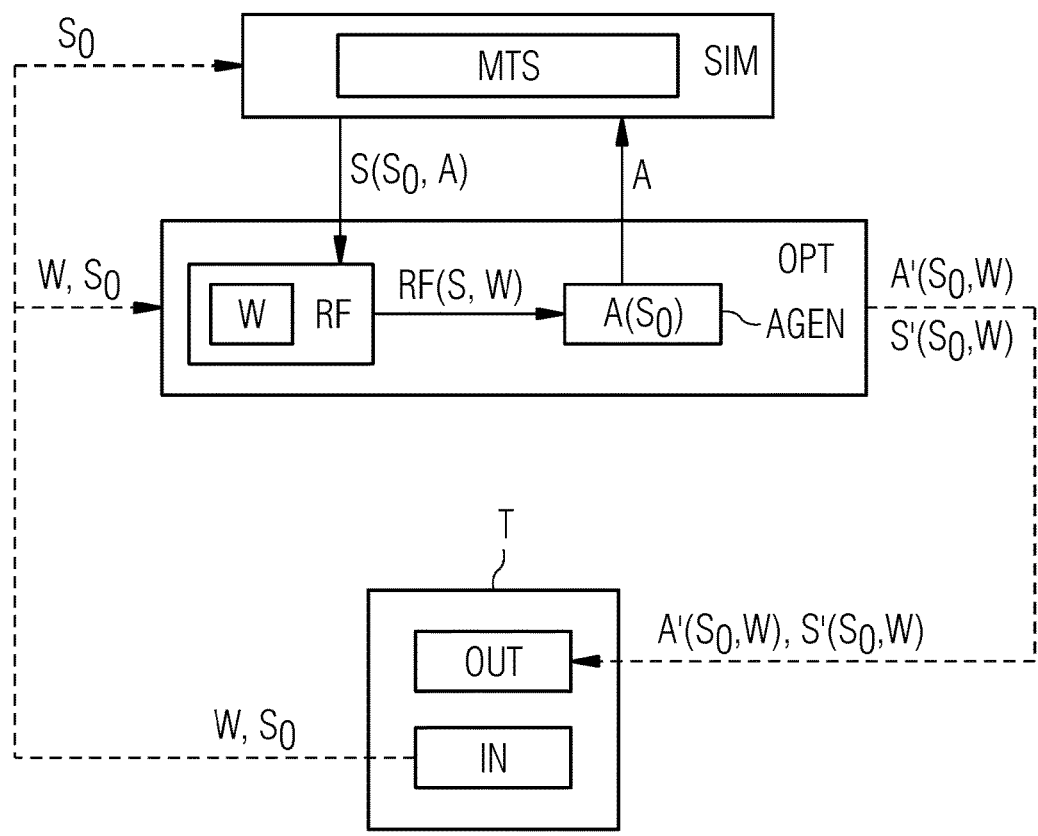

METHOD FOR COMPUTER-AIDED INSTALLATION CONTROL OPTIMIZATION USING A SIMULATION MODULE

CROSS-REFERENCE TO RELATED APPLICATIONS

This application claims priority to PCT Application No. PCT/EP2015/059844, having a filing date of May 5, 2015, based off of DE Application No. 10 2014 212 747.5 having a filing date of Jul. 1, 2014, the entire contents of which are hereby incorporated by reference.

FIELD OF TECHNOLOGY

When controlling complex dynamic systems, for example gas turbines, wind turbines or other technical installations or systems, it is generally desirable to optimize the system behavior with respect to predefined criteria. In gas turbines for example, the aim is generally to improve the effectiveness, efficiency and/or combustion dynamics and to reduce exhaust gas emissions, combustion chamber humming and/or wear.

BACKGROUND

A complex dynamic system usually has a multiplicity of interacting control parameters. In order to control the dynamic system, a multiplicity of possible control actions which influence the system behavior are therefore available to a system controller. In this case, different control actions can interact in a very complex manner, in particular also in opposite directions. A control action which has a positive effect on a first control criterion may therefore have a negative effect on a second control criterion. In addition, the same control action may have a positive or negative effect depending on the system state.

Computer-aided controllers or regulators which are specifically geared to complying with or optimizing predefined control criteria are known. However, such control criteria generally differ depending on the application situation of a dynamic system. Different limit values for the exhaust gas emissions may therefore be prescribed for a power plant in different countries, for example. Whereas low exhaust gas emissions may have priority over other control criteria in a first country, low wear and low maintenance costs may have priority in a second country. A multiplicity of control criteria which influence one another should generally be weighted in a suitable manner in order to achieve control which is optimum for the present situation.

In order to optimize predefined control criteria, contemporary controllers often use machine learning techniques. For example, a neural network may be trained to optimize the control of a dynamic system with respect to one or more predefined control criteria. However, training of a neural network is generally comparatively time-consuming. If a control criterion changes, it often takes a comparatively long time for a learning neural network to adapt to the changed control criterion. It is therefore often very time-consuming to optimize suitable control criteria for an intended purpose or a new situation.

SUMMARY

An aspect relates to an apparatus and a method for computer-aided control optimization for a technical system, which allow control criteria to be optimized in a more flexible and quicker manner.

The following provides an interactive assistance system and a corresponding method for computer-aided control optimization for a technical system. The technical system may be, for example, a gas turbine, a wind turbine, a power plant or another technical installation or another technical system. An input terminal serves for reading in at least one state parameter, which indicates a first system state of the technical system, and for reading in at least one setting parameter for setting up a reward function suitable for training a neural network. A simulation module serves for simulating performance of an action sequence on the technical system starting from the first system state and for predicting resulting successor states of the technical system. Furthermore, an optimization module which is coupled to the input terminal and to the simulation module is provided. The optimization module is used to set up the reward function on the basis of the setting parameter, to generate a multiplicity of action sequences for the first system state, to transmit the action sequences to the simulation module and to receive the resulting successor states. In addition, the optimization module is used to determine rewards which can be expected for the resulting successor states by means of the reward function which has been set up, and to determine a reward-optimizing action sequence. An output terminal is provided for outputting a system state resulting from the reward-optimizing action sequence.

The following allows quick interactive optimization or improvement of control criteria for a technical system for a respectively predefined situation and/or for a respectively intended purpose. The control criteria can be modified in a flexible manner by a user on the input terminal by suitably setting up the reward function suitable for training a neural network. Effects of these modifications can be directly appreciated by the user on the output terminal. On the basis of this, the user can then make further adaptations to the reward function or to the control criteria and can therefore gradually interactively optimize the reward function or the control criteria. The use of a reward function to optimize control criteria is advantageous in so far as the reward function, after it has been interactively optimized, can be directly used to train a controller of the technical system which is based on a neural network.

The use of the simulation module allows successor states of the technical system which are caused by action sequences to be determined in a quick and cost-effective manner. This also applies, in particular, to those action sequences which could be carried out on the real technical system only with a great amount of effort. In addition, the simulation module—assuming there is sufficient computing power—can provide the successor states often more quickly than the real technical system and can therefore shorten the optimization process.

According to one advantageous embodiment of the invention, the optimization module can be set up to optimize action sequences comprising continuous manipulated variables. Such continuous manipulated variables, for example a gas supply in a gas turbine, can be controlled in many technical systems.

Furthermore, a stochastic and/or non-convex optimization method for determining the reward-optimizing action sequence can be implemented in the optimization module. Stochastic optimization methods can also be successfully applied to high-dimensional and/or non-linear optimization problems. Non-convex optimization methods are advantageous if different optimization parameters are dependent on one another.

Particle swarm optimization, a genetic optimization method, a simulated annealing method and/or a stochastic gradient method can preferably be implemented as the optimization method.

Furthermore, the simulation module can be set up to process sensor data relating to the technical system. A simulation module set up in such a manner can also be operated on the real technical system with real sensor data and can be optimized with regard to its simulation fidelity.

Furthermore, a neural network, a support vector machine, a Gaussian process model and/or a physical model for simulating the technical system can be implemented in the simulation module.

According to one advantageous embodiment, the neural network can be implemented as a recurrent neural network. Such a recurrent neural network allows time-dependent patterns to be efficiently detected.

In addition, the neural network may already be pre-trained for the technical system.

According to another embodiment, the reward-optimizing action sequence can be output on the output terminal.

A temporal progression of the resulting system state, the reward-optimizing action sequence and/or a return value of the reward function can preferably be output on the output terminal. This allows the optimization success to be quickly assessed by the user. In particular, the user can directly compare the extent to which a system behavior which is optimal with regard to a currently set control criterion corresponds to a system behavior desired by the user.

In addition, the output terminal can output a plurality of variants of the reward function and/or of the state parameter for user selection on the input terminal. In particular, a preselection of possible reward functions and/or state parameters, which is made according to a predefined criterion, can be output.

An exemplary embodiment of the invention is explained in more detail below using the drawing.

BRIEF DESCRIPTION

Some of the embodiments will be described in detail, with reference to the following FIGURES, wherein like designations denote like members, wherein:

The FIGURE schematically shows an interactive assistance system according to an embodiment of the invention.

DETAILED DESCRIPTION

The FIGURE schematically illustrates an interactive assistance system for computer-aided control optimization for a dynamic technical system. The technical system may be, for example, a gas turbine, a wind turbine, a power plant, a manufacturing installation or another technical installation or another dynamic system.

The interactive assistance system comprises a terminal T having an input terminal IN, for example a keyboard, and having an output terminal OUT, for example a screen.

The input terminal IN is used to read in a state parameter which describes a first system state $S_0$ of the technical system. The first system state $S_0$ can be interactively pre-defined by a user of the terminal T and describes a starting state from which a simulation of the technical system starts. The first system state $S_0$ is represented by a vector of state parameters of the technical system, a so-called state vector $S_0=((S_0)_1, \ldots (S_0)_N)$, where N indicates a number of state parameters of the technical system. The state parameters describe a state of the technical system at the start of the simulation. State parameters may be, in particular, physical variables such as temperature, pressure or voltage or, in the case of a gas turbine for example, may describe combustion chamber humming or emission of nitrogen oxides. The user may explicitly input the different state parameters on the interactive input terminal IN or else may choose from state parameters or system states proposed on the output terminal OUT.

The state vector $S_0$ describing the first system state is transmitted from the input terminal IN to a simulation module SIM for simulating the dynamic behavior of the technical system. Starting from the first system state $S_0$, the simulation module SIM simulates a state sequence S resulting from $S_0$ as a result of the dynamic behavior of the technical system, that is to say the successor states resulting from $S_0$. The state sequence $S=(S_1, \ldots, S_T)=: (S_i)$ is a sequence of temporally successive system states $S_i$ of the technical system, where $i=1, \ldots, T$ denotes different successive time steps and T is the number of time steps taken into account. The system states $S_i$ are each represented by a state vector of the technical system, that is to say by a vector of state parameters $S_i=((S_i)_1, \ldots (S_i)_N)$ which describes the state of the technical system in the ith time step. In summary, the state sequence S is therefore represented by the sequence of state vectors $S=(S_i)_n$, $i=1, \ldots, T$, $n=1, \ldots, N$.

The input terminal IN is also used to interactively read in a setting parameter W for a reward function RF. In the present exemplary embodiment, a vector $W=(W_1, \ldots, W_N)$ of the length N with weights $W_i$ for the N different state parameters of the technical system is read in as the setting parameter W. The setting parameters W interactively predefined by the user are transmitted from the input terminal IN to an optimization module OPT. The optimization module OPT implements the reward function RF and parameterizes it by means of the setting parameters W. Such a reward function RF can also be used, in particular, to train a neural network. The reward function RF assigns a reward which can be expected to a respective state vector $S_i$ of the technical system or to a sequence of state vectors S according to the optimization criterion set by means of the setting parameter W. The reward function RF represents a specific optimization criterion or optimization goal for the technical system. The optimization goal of the optimization module OPT is therefore to maximize the reward which is preferably accumulated over a plurality of time steps and is determined by means of the reward function RF. The user can change the reward function RF, the optimization goal or the control criterion by interactively modifying the setting parameters W and can interactively observe and assess the effects of this change. In this manner, the user can quickly adapt the optimization goal to a new situation or to a specific purpose. This allows situation-adapted control criteria to be optimized quickly and flexibly.

In the present exemplary embodiment, the setting parameters W are represented by a vector with weights for the different state parameters of the technical system. The reward function RF can therefore be implemented, for example, as $RF=RF(S_i, W)=W_1 \cdot (S_i)_1 + \ldots + W_N \cdot (S_i)_N$. This represents a reward in the ith time step. For example, $(S_i)_1$ in this case may be a state parameter describing the combustion chamber humming and $(S_i)_2$ may be a state parameter describing the emission of nitrogen oxides. Alternatively or additionally, the reward function RF can also link state parameters of different time steps or an entire state sequence. As an alternative or in addition to calculating a linear sum of weighted state parameters, the reward function RF can also be parameterized in a non-linear manner by means of specific setting parameters W.

The simulation module SIM comprises a recurrent neural network having a pre-trained neural model MTS of the technical system. The neural model MTS is suitable for processing sensor data relating to the technical system and can therefore be directly adopted by an existing technical system or used further for this system. In particular, the state parameters describing the first system state $S_0$ are transmitted to the simulation module SIM as sensor data. As an alternative or in addition to the recurrent neural network, a support vector machine, a Gaussian process model and/or a physical model for simulating the technical system can also be implemented in the simulation module SIM.

The simulation module SIM simulates the performance of an action sequence A for the technical system starting from the first state $S_0$. The action sequence A comprises a sequence of temporally successive action vectors $A_i$, i=1, ..., T, that is to say $A=(A_1, ..., A_T)$, where T (as above) indicates the number of time steps taken into account. An action vector $A_i$ describes control actions to be performed on the technical system in the ith time step. A specific setting of manipulated variables for the dynamic technical system is referred to as a control action or action for short. Gas supply, compression, cooling or other physical manipulated variables, in particular continuous physical manipulated variables, may be mentioned as an example of such manipulated variables for a gas turbine, for example.

A control action $A_i$ changes the technical system from the state $S_{i-1}$ to the state $S_i$. The control action $A_i$ is represented by a vector having M components, where M indicates the number of manipulated variables of the technical system. Overall, the action sequence A is therefore represented by $A=(A_i)_m$, i=1, ..., T, m=1, ..., M.

The simulation module SIM uses the neural model MTS to simulate the dynamic behavior of the technical system starting from the first system state $S_0$ under the influence of an action sequence A. In this case, the successor states $S(S_0,A)=(S_1, ..., S_T)$ of the technical system which result from A are predicted, that is to say forecast. In this case, the recurrent neural network of the simulation module SIM is preferably used only to simulate the dynamic behavior of the technical system and is not trained during the simulation. The action sequence A to be performed is supplied, inter alia, to the recurrent neural simulation by the simulation module SIM as an input variable, with the result that the simulation as such can be carried out in a manner substantially independent of the control criterion or the reward function RF. In contrast to the neural simulation, during training of a neural controller, a reward-optimizing action sequence should be determined by the neural controller itself. The neural controller must therefore explicitly take into account the control criterion or the reward function RF, whereas the neural simulation predicts only effects of an action sequence on the system behavior. Since training of a neural network is relatively time-consuming, a neural controller can react only slowly to changes in the reward function RF. In contrast to this, the neural simulation as such which is carried out by the simulation module SIM is substantially independent of the reward function RF and can therefore already be pre-trained, for example on the basis of the real technical system.

The optimization module OPT is coupled to the simulation module SIM and to the terminal T. On the basis of the setting parameters W received from the terminal T, the optimization module OPT sets up the reward function RF as a function of a state sequence S according to RF=RF(S,W).

The optimization module OPT has an action generator AGEN. The latter generates a multiplicity of action sequences $A(S_0)$, starting from the first system state $S_0$, as part of an optimization method for maximizing an accumulated reward determined by means of the reward function RF which has been set up. Stochastic optimization methods and/or, in particular, gradient-free optimization heuristics for non-convex optimization problems can be used as optimization methods, for example particle swarm optimization, a genetic optimization method, a simulated annealing method and/or a stochastic gradient method. Each of the action sequences $A(S_0)$ generated is transmitted to the simulation module SIM. There, the respectively resulting successor states $S(S_0,A)$ are predicted and are transmitted to the optimization module OPT. For a respective successor state S, a reward RF(S,W) which can be expected according to the currently set optimization criterion is determined and is transmitted to the action generator AGEN. Depending on the reward which can be expected, new action sequences $A(S_0)$ which allow a higher reward to be expected are generated according to the optimization method implemented. These new action sequences $A(S_0)$ are again transmitted to the simulation module SIM in order to again determine the reward which can be expected for this depending on the simulation result. In this manner, the optimization module OPT optimizes action sequences A of the length T starting from the first system state $S_0$ on the basis of the simulation by the simulation module SIM. A respective generated action sequence in this case represents a proposal to control the technical system in the next T time steps. Action sequences having a multiplicity of time steps are generally required for complex technical systems, for example gas turbines, in order to also represent long-term dynamic effects. This generally results in high-dimensional optimization problems for which the stochastic methods mentioned above, in particular, are particularly suitable.

After a plurality of successive optimization rounds, a reward-optimizing action sequence A' in the sense of the currently set reward function RF is determined. The reward-optimizing action sequence A' comprises (like other action sequences A) a sequence of vectors of manipulated variables, that is to say $A'=(A'_i)_m$, i=1, ..., T, m=1, ..., M. The reward-optimizing action sequence A' can be interpreted as a function of the first system state $S_0$ and the setting parameters W: $A'(S_0,W)$. Different selections of the first system state $S_0$ and of the setting parameters W therefore allow reward-optimizing action sequences A' to be optimized independently of one another by the optimization module OPT.

Starting from the first system state $S_0$, the simulation module SIM determines a state sequence $S'=(S'_i)_n$, i=1, ..., T and n=1, ..., N, resulting from the reward-optimizing action sequence A'. The resulting state sequence S' corresponds to the system behavior predicted by the simulation module SIM during action of the reward-optimizing action sequence A'. The reward-optimizing action sequence $A'(S_0, W)$ and the resulting state sequence $S'(S_0, W)$ are then transmitted from the optimization module OPT to the terminal T. The return values of the reward function $RF(S'_i, W)$, i=1, ..., T, or other variables derived from A' and/or S' can preferably also be transmitted to the terminal T. The output terminal OUT can then display reward-optimizing action vectors $A'_i$, resulting state vectors $S'_i$ and/or associated reward values $RF(S'_i, W)$ over time i=1, ..., T. This allows the optimization success to be quickly assessed by the user. On the basis of this, the user can then interactively make further adaptations to the reward function RF or to the control criteria and the starting state $S_0$ on the terminal T.

The optimization methods used by the optimization module OPT generally converge considerably more quickly than training of a neural network. As already mentioned above, the recurrent neural network of the simulation module SIM is substantially independent of the reward function RF and need not be retrained if it is changed. The recurrent neural network is only evaluated in order to simulate the technical system. Such an evaluation is often also referred to as recall and is very efficient and performant. The logical separation of the simulation implemented by means of a recurrent neural network from the optimization based on fast stochastic optimization methods therefore allows the reward-optimizing action sequence A' to be determined in a particularly performant and efficient manner for the simulated technical system.

Therefore, after a new first system state $S_0$ has been input and a new reward function RF has been set, the effects thereof can already be discerned by a user after a short time, with the result that the reward function can be adapted or optimized interactively by the user on the terminal T by considering different optimization goals. In this manner, the interactive assistance system allows the reward function or the control criteria to be quickly interactively optimized with respect to the desired system behavior.

In particular, the interactive assistance system can assist the user with efficiently finding an optimum operating point in the high-dimensional action space of the technical system. In this case, the user can quickly test and compare different control criteria and can therefore create a reward function which is optimal in a predefined situation for a technical system. In addition, the interactive assistance system can be used to assess other controllers for the technical system by providing a reference for the performance of the other controllers.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An interactive assistance system for computer-aided control optimization for a technical system, having
    a) an input terminal for reading in at least one state parameter, which indicates a first system state of the technical system, and at least one setting parameter for setting up a reward function suitable for training a neural network, wherein said at least one setting parameter is a weighted vector for said at least one state parameter of the technical system,
    b) a simulation module for simulating performance of an action sequence on the technical system starting from the first system state and for predicting resulting successor states of the technical system, wherein the simulation module includes a neural network for simulation of the technical system,
    c) an optimization module, coupled to the input terminal and to the simulation module, and configured to:
        i) set up the reward function on the basis of the setting parameter (W), said reward function is a summation of a product of each state parameter and each respective setting parameters for said each state parameter,
        ii) generate a multiplicity of action sequences for the first system state ($S_0$),
        iii) transmit the action sequences to the simulation module and to receive the resulting successor states,
        iv) determine rewards which can be expected for the resulting successor states by means of the reward function which has been set up, and
        v) determine a reward-optimizing action sequence as a function of said first system state and said at least one setting parameter, where different selections of said first system state and said at least one setting parameter thereby allowing said reward-optimizing action sequence to be independently optimized, and
    d) an output terminal for outputting a system state resulting from the reward-optimizing action sequence,
    wherein said reward-optimizing action sequence and said multiplicity of state sequences are transmitted from the optimization module to the output terminal, and
    wherein the simulation of the technical system by the simulation module is independent of the reward function.

2. The interactive assistance system as claimed in claim 1, wherein the optimization module is set up to optimize action sequences comprising continuous manipulated variables.

3. The interactive assistance system as claimed in claim 1, wherein a stochastic and/or non-convex optimization method for determining the reward-optimizing action sequence is implemented in the optimization module.

4. The interactive assistance system as claimed in claim 3, wherein particle swarm optimization, a genetic optimization method, a simulated annealing method and/or a stochastic gradient method is/are implemented as the optimization method.

5. The interactive assistance system as claimed in claim 1, wherein the simulation module is set up to process sensor data relating to the technical system.

6. The interactive assistance system as claimed in claim 1, wherein a support vector machine, a Gaussian process model and/or a physical model for simulating the technical system is/are implemented in the simulation module.

7. The interactive assistance system as claimed in claim 1, wherein the neural network is implemented as a recurrent neural network.

8. The interactive assistance system as claimed in claim 1 wherein the neural network is pre-trained for the technical system.

9. A method for interactive computer-aided control optimization for a technical system,
    a) an input terminal reading in at least one state parameter, which indicates a first system state of the technical system, and at least one setting parameter for setting up a reward function suitable for training a neural network, where said at least one setting parameter is a weighted vector for said at least one state parameter of the technical system,
    b) the state parameter and the setting parameter being transmitted to an optimization module which sets up the reward function on the basis of the setting parameter, said reward function is a summation of a product of each state parameter and each respective setting parameters for said each state parameter,
    c) the optimization module generating a multiplicity of action sequences for the first system state and transmitting them to a simulation module, d) the simulation module respectively simulating performance of the transmitted action sequences on the technical system starting from the first system state ($S_0$) and predicting resulting successor states of the technical system, wherein the simulation module uses a neural network for simulation of the technical system,
e) the successor states being transmitted to the optimization module,
f) the optimization module determining rewards which can be expected for the successor states by means of the reward function which has been set up and determining a reward-optimizing action sequence as a function of said first system state and said at least one setting parameter, wherein different selections of said first system state and said at least one setting parameter thereby allowing said reward-optimizing action sequence to be independently optimized, and
g) a system state resulting from the reward-optimizing action sequence being output by an output terminal,
wherein said reward-optimizing action sequence and said multiplicity of state sequences are transmitted from the optimization module to the output terminal, and
wherein the simulation of the technical system by the simulation module is independent of the reward function.

10. The method as claimed in claim 9, wherein the reward-optimizing action sequence is output on the output terminal.

11. The method as claimed in claim 10, wherein a temporal progression of the resulting system state, the reward-optimizing action sequence and/or a return value of the reward function is output on the output terminal.

12. The method as claimed claim 9, wherein the output terminal outputs a plurality of variants of the reward function and/or of the state parameter for user selection on the input terminal.

13. A computer program product for computer-aided control optimization for a technical system, comprising a non-transitory computer readable storage device storing computer readable program code, the computer readable program code comprising program commands for the purposes of executing the method as claimed in claim 9.

* * * * *